(12) United States Patent
Wang et al.

(10) Patent No.: US 12,221,533 B2
(45) Date of Patent: Feb. 11, 2025

(54) HETEROPHASIC POLYPROPYLENE COMPOSITION

(71) Applicant: BOREALIS AG, Vienna (AT)

(72) Inventors: Jingbo Wang, Linz (AT); Elisabeth Potter, Linz (AT); Luc Monnissen, Arsimont (BE); Meta Cigon, Vienna (AT)

(73) Assignee: BOREALIS AG, Vienna (AT)

( * ) Notice: Subject to any disclaimer, the term of this patent is extended or adjusted under 35 U.S.C. 154(b) by 626 days.

(21) Appl. No.: 17/610,765

(22) PCT Filed: May 14, 2020

(86) PCT No.: PCT/EP2020/063457
§ 371 (c)(1),
(2) Date: Nov. 12, 2021

(87) PCT Pub. No.: WO2020/229597
PCT Pub. Date: Nov. 19, 2020

(65) Prior Publication Data
US 2022/0306851 A1    Sep. 29, 2022

(30) Foreign Application Priority Data

May 16, 2019    (EP) .................................... 19174794

(51) Int. Cl.
*C08L 23/16*    (2006.01)
*C08L 23/12*    (2006.01)

(52) U.S. Cl.
CPC ........... *C08L 23/16* (2013.01); *C08L 23/0815* (2013.01); *C08L 23/12* (2013.01); *C08L 2205/22* (2013.01); *C08L 2205/24* (2013.01); *C08L 2207/02* (2013.01); *C08L 2207/066* (2013.01); *C08L 2314/06* (2013.01)

(58) Field of Classification Search
CPC ...... C08L 23/12; C08L 23/16; C08L 23/0815; C08L 2207/02; C08L 2205/02
See application file for complete search history.

(56) References Cited

U.S. PATENT DOCUMENTS

| | | | | |
|---|---|---|---|---|
| 6,939,919 B2 * | 9/2005 | Tau | ..................... | C08L 23/0815 525/240 |
| 7,449,522 B2 * | 11/2008 | Aguirre | ..................... | C08J 5/18 525/240 |
| 7,795,321 B2 * | 9/2010 | Cheung | ................ | C08L 23/0815 521/142 |
| 8,030,403 B2 * | 10/2011 | Gahleitner | .............. | C08L 23/16 525/240 |
| 2017/0044359 A1 * | 2/2017 | Kahlen | ................. | C08F 210/06 |

FOREIGN PATENT DOCUMENTS

| | | | | |
|---|---|---|---|---|
| CN | 101484522 A | * | 7/2009 | ............ C08L 23/142 |
| EP | 0887379 | | 12/1998 | |
| EP | 2022824 | | 2/2009 | |
| EP | 2431416 | | 3/2012 | |
| EP | 2527594 | | 11/2012 | |
| EP | 2586825 | | 5/2013 | |
| WO | 92/12182 | | 7/1992 | |
| WO | 99/24478 | | 5/1999 | |
| WO | 99/24479 | | 5/1999 | |
| WO | 00/68315 | | 11/2000 | |
| WO | 2004/000899 | | 12/2003 | |
| WO | 2004/111095 | | 12/2004 | |
| WO | WO-2006101999 A2 | * | 9/2006 | .............. C08F 10/00 |
| WO | 2013/174733 | | 11/2013 | |
| WO | 2014/187687 | | 11/2014 | |
| WO | 2017/148969 | | 9/2017 | |
| WO | 2017/216095 | | 12/2017 | |
| WO | 2019/002345 | | 1/2019 | |

OTHER PUBLICATIONS

Busico V et al. Alk-1-ene polymerization in the presence of a monocyclopentadienyl Zirconium(IV) acetamidinate catalyst: Microstructural and mechanistic insights. Macromol. Rapid Commun. 2007, 28(10), 1128.
Cheng HN. 13C NMR analysis of ethylene-propylene rubbers. Macromolecules 1984, 17, 1950-1955.
Jonsson, JA. Nomenclature for non-linear chromatography (IUPAC Recommendations 1996). Pure Appl. Chem., 1996, 68(8), 1591-1595.
Singh G et al. Triad sequence determination of ethylene-propylene copolymers—application of quantitative $^{13}$C NMR. Polymer Testing, 2009, 28(5), 475-479.
Wang WJ et al. Structural analysis of ethylene/propylene copolymers synthesized with a constrained geometry catalyst. Macromolecules 2000, 33, 1157-1162.
Zhou Z et al. A new decoupling method for accurate quantification of polyethylene copolymer composition and triad sequence distribution with 13C NMR. J. Mag. Reson. 2007, 187(2) 225-233.
International Search report and written opinion mailed Jul. 24, 2020 in International Application PCT/EP2020/063457 (12 pages).

* cited by examiner

*Primary Examiner* — Rip A Lee
(74) *Attorney, Agent, or Firm* — Meunier Carlin & Curfman LLC

(57) ABSTRACT

A heterophasic polypropylene composition comprises a matrix based on a propylene-random copolymer and a linear low density polyethylene dispersed in the matrix. The heterophasic polypropylene composition has both improved impact strength and reduced amount of fraction soluble in cold xylene (XCS), while maintaining optical properties. Further, the heterophasic polypropylene composition has an optimised ratio of impact strength to the amount of fraction soluble in cold xylene (XCS).p.

20 Claims, No Drawings

HETEROPHASIC POLYPROPYLENE COMPOSITION

CROSS REFERENCE TO RELATED APPLICATIONS

This application is a United States National Phase Patent Application of International Patent Application Number PCT/EP2020/063457, filed on May 14, 2020, which claims the benefit of priority to EP Application Serial No. 19174794.8, filed May 16, 2019, both of which are incorporated by reference herein in their entireties.

The present invention relates to a heterophasic polypropylene composition comprising a matrix comprising a propylene-random copolymer and an linear low density polyethylene dispersed in the matrix. The heterophasic polypropylene composition has both improved impact strength and reduced amount of fraction soluble in cold xylene (XCS), while maintaining optical properties. Further, the heterophasic polypropylene composition has an optimised ratio of impact strength to the amount of fraction soluble in cold xylene (XCS).

BACKGROUND INFORMATION

Polypropylene polymers are increasingly used in different demanding applications and undergoing a continuous search for tailoring their properties to meet the requirement of said applications.

The demands can be challenging, since many polymer properties are directly or indirectly interrelated, i.e. improving a specific property can only be accomplished on the expense of another property. E.g., impact properties can be improved by dispersing a rubber phase within the polymer matrix, thereby obtaining a heterophasic polypropylene composition. Said rubber however, is amorphous and can be easily extracted in organic solvents, thereby increasing the amount of fractions soluble in cold xylene (XCS).

Further it is well known, that good impact strength can be achieved by bigger rubber particles dispersed in a polymer matrix, which at the same time will impede optical properties.

At the same time, there are several applications requiring polymers, having low amount of extractable fractions while having both good impact and a low haze to allow good insight on their content.

DESCRIPTION OF THE PRIOR ART

EP 2527594A1 discloses PP random copolymers with high stiffness and low haze. The claimed compositions comprise (a) 30-70 wt.-% of a first polypropylene random copolymer with 0.5-3.0 wt.-% C2 and (b) 30-70 wt.-% of a second polypropylene random copolymer with 2.5-10.0 wt.-% C2, having a total MFR of 65-200 g/10 min and a total C2 content of 1.5-8.0 wt.-%. The materials disclosed have impact strength of below 6.0 kJ/m$^2$ and a higher MFR and do not comprise any polyethylene.

WO 2014/187687 A1 discloses high-flow PP random copolymers for compositions with MFR230/2.16 of 25-100 g/10 min and a comonomer content of 2.0-11.0 mol % (1.3-7.6 wt.-%) which are optionally bimodal. The materials disclosed have impact strength of below 6.0 kJ/m$^2$ and do not comprise any polyethylene.

WO 2019/002345 A1 relates to a process for producing a polypropylene random copolymer composition by sequential polymerisation the polypropylene composition having an improved balanced combination of high flowability, high stiffness and impact, and high level of optical properties. The patent application is not concerned with heterophasic polypropylene compositions.

WO 2017/148969A1 discloses a heterophasic polyolefin composition comprising a high-flow matrix comprising a propylene homo- and/or copolymer and an elastomeric alpha-olefin copolymer phase dispersed in the matrix, having high impact strength and a good impact/stiffness balance. The claimed compositions have a fraction soluble in cold xylene (XCS) of above 20 wt.-%, an MFR 230/2.16 of 25-250 g/10.

EP 2431416A1 discloses a heterophasic polypropylene composition having a melt flow rate MFR$_2$ (230° C.) of equal or above 15 g/10 min comprising (a) a crystalline polypropylene matrix (b) an elastomeric propylene copolymer phase having a propylene content in the range of 40 to 80 wt.-%, (c) a first polyethylene having a density in the range 905 to 925 kg/m$^3$ and melt flow rate MFR$_2$ (190° C.) of below 30 g/10 min, and (d) a second polyethylene having a density of above 915 kg/m$^3$, and a melt flow rate MFR 2 (190° C.) of equal or above 30 g/10 min.

The inventive example reports a Charpy notched impact strength of 6 kJ/m$^2$ and rather high values for the Haze.

WO 2013/174733A1 discloses a polymer composition of a propylene copolymer and a high density polyethylene, wherein said composition has a MFR2 of at least 25.0 g/10 min and said propylene copolymer has a xylene cold soluble content in the range of 7.0 to below 20.0 wt.-%. The HDPE used has a density of 958 kg/m$^3$ and a melting temperature of 134° C. The case is not concerned with optical properties and does not disclose Haze or transparency values. The material is not regarded as transparent.

It is known in the art, that good transparency can be achieved or maintained, if the refractive indices of a modifier and the embedding matrix are as similar as possible.

Furthermore, the modifier used should have good miscibility with the matrix and allow good dispersion, to avoid big agglomerates, which again could impede or worsen optical properties.

Though, by choosing such modifiers, it is not always possible to increase the impact behaviour without sacrificing other properties like the amount of fractions soluble in cold xylene (XCS).

OBJECT OF THE INVENTION

So it has been the object of the invention to provide a polypropylene composition, which overcomes the disadvantages of the prior art, especially by providing a composition with good impact properties and low amounts of fraction soluble in cold xylene (XCS), combined with low haze.

The present invention is based on the finding, that by properly selecting the modifier phase in a heterophasic propylene composition one can provide a composition with improved impact strength, which has low amounts of a fraction soluble in cold xylene (XCS) and low haze.

It was found, that this can be achieved with a modifier being a linear low density polyethylene (LLDPE) with a density in the range of 905-923 kg/m$^3$, having a melting peak in the range of 110-125° C. and a specific melt enthalpy, to generate a heterophasic polypropylene composition of the present invention.

It was surprisingly found, that—although the polyethylene used as a modifier in the present invention has a rather high density, i.e. higher than the matrix embedding it—the refractive indices of the matrix and the modifier are rather similar, resulting in a heterophasic polypropylene composition with good optical properties in the sense of a low haze.

Accordingly the inventors have identified a heterophasic polypropylene composition (PP-C) comprising
65.0-95.0 wt.-% of a propylene random copolymer having a comonomer content of 2.0 to 5.0 wt.-% and
5.0-35.0 wt.-% of a linear low density polyethylene (LL-DPE) having a density in the range of 905 to 923 kg/m$^3$, when measured according to ISO1183, wherein the heterophasic polypropylene composition is characterised by having at least one first melting peak in the range of 110-125° C. and said first melting peak having a melt enthalpy of 30-100 J/g when determined according to ISO11357.

Viewed from another aspect, the invention provides articles comprising said heterophasic polypropylene composition.

Viewed from still a further aspect, the invention provides the use of said heterophasic polypropylene composition for producing articles, especially injection moulded articles, like caps or closures or containers, especially thin walled articles or containers.

The present invention provides heterophasic polypropylene composition which have both low amounts of fraction soluble in cold xylene (XCS) as well as good impact properties. Furthermore, it provides a balanced ratio of notched impact strength (NIS) to the amount of fraction soluble in cold xylene (XCS).

The materials of the present invention give good impact properties both in unidirectional conditions (namely Charpy Notched impact strength) as well as under biaxial conditions, (namely the Instrumented Puncture Test, IPT). Furthermore, good impact behaviour is shown at room temperatures as well as at temperatures below 0° C.

The present invention provides heterophasic polypropylene compositions having good transparency in the sense of low haze and shows well balanced ratio between Charpy notched impact strength and Haze$_1$ (when determined at 1 mm thick plaques).

DETAILED DESCRIPTION

The heterophasic polypropylene composition comprises
65.0-95.0 wt.-% of a propylene random copolymer having a comonomer content of 2.0 to 5.0 wt.-% and
5.0-35.0 wt.-% of a linear low density polyethylene (LL-DPE) having a density in the range of 905 to 923 kg/m$^3$, when measured according to ISO1183, wherein the heterophasic polypropylene composition is characterised by having at least one first melting peak in the range of 110-125° C. and said first melting peak having a melt enthalpy of 30-100 J/g when determined according to ISO11357.

Preferably, the amount of the propylene-random copolymer may be in the range of 70.0-92.0 wt.-%, more preferably in the range of 72.0-90.0 wt.-%.

Accordingly, the heterophasic polypropylene composition may preferably comprise 8.0-30.0 wt.-%, more preferably 10.0-28.0 wt.-% of the LLDPE having a density in the range of 905-923 kg/m$^3$.

The heterophasic polypropylene composition may have a Melt Flow rate (MFR230/2.16) according to ISO 1133 of in the range of from 1.0 to 60 g/10 min, preferably in the range of from 5.0 to 45 g/10 min, more preferably in the range of from 10 to 30 g/10 min. The MFR$_2$ is determined according to ISO 1133, at a temperature of 230° C. and under a load of 2.16 kg.

The heterophasic polypropylene composition is characterised by at least two distinct melting temperatures (Tm1 and Tm2).

The first melting temperature (Tm1) lies in the range of 110-125° C., preferably in the range of 115 to 124° C., more preferably in the range of 119-123° C.

The second melting temperature (Tm2) may be in the range of 140° C.-165° C., preferably in the range of 143-163° C., more preferably in the range of 149-161° C.

The heterophasic polypropylene composition of the present invention may further be characterised by a specific melt enthalpy (Hm1) of the lower melting peak (Tm1) occurring between 110-125° C. The melt enthalpy (Hm1) may be in the range of 30-100 J/g, preferably in the range of 31-80 J/g, more preferably in the range of 32-60 J/g.

The heterophasic polypropylene composition has a fraction soluble in cold xylene (XCS) in the range of 0.1-18.0 wt.-% when determined according to ISO 16152 at 25° C., preferably in the range of 3.0-15.0 wt.-%, more preferably in the range of 5.0-12.0 wt.-%.

In a particular embodiment, the heterophasic polypropylene composition may comprise one or more alpha nucleating agents.

Accordingly in a preferred embodiment, the heterophasic polypropylene composition may comprise
64.0-94.99 wt.-% of a propylene random copolymer having comonomer content of 2.0-5.0 wt.-% and
5.0-35 wt.-% of a linear low density polyethylene having a density in the range of 905-923 kg/m$^3$ and
100-10.000 ppm of one or more alpha nucleating agents, wherein all percentages are relative to the total amount of the heterophasic polypropylene composition.

Preferably, the heterophasic polypropylene composition may comprises 500-5000 ppm alpha-nucleating agent(s), more preferably 1000-2000 ppm.

The alpha-nucleating is preferably soluble in the heterophasic polypropylene composition of the present invention.

The alpha-nucleating agent is preferably selected from the group of sorbitol, nonitol or trisamide based nucleating agents, such as:
di(alkylbenzylidene)sorbitols as 1,3:2,4-dibenzylidene sorbitol, 1,3:2,4-di(4-methylbenzylidene) sorbitol, 1,3:2,4-di (4-ethylbenzylidene) sorbitol and 1,3:2,4-Bis(3,4-dimethylbenzylidene) sorbitol;
nonitol derivatives: e.g. 1,2,3-trideoxy-4,6;5,7-bis-O-[(4-propylphenyl)methylene] nonitol; and benzene-trisamides: like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide are equally preferred.

The alpha-nucleating agent is preferably selected from 1,3:2,4Bis(3,4-dimethylbenzylidene) sorbitol and/or N-[3,5-bis-(2,2-dimethyl-propionylamino)-phenyl]-2,2-dimethyl-propionamide.

In a particular preferred embodiment, the heterophasic polypropylene composition of the present invention may comprise further nucleation agents in addition to and different to the nucleating agents as defined above.

It is envisaged that the heterophasic polypropylene composition of the present invention comprises, at least two nucleating agents, preferably comprises exactly two nucleating agents.

Such further nucleating agents can be selected from the groups consisting of
(i) salts of monocarboxylic acids and polycarboxylic acids, e.g. sodium benzoate or aluminum tert-butylbenzoate; or dicarboxylate salt compounds, e.g. bicyclic [2.2.1] heptane dicarboxylate salt, wherein bicyclic [2.2.1] heptane dicarboxylate salt is preferred.
(ii) salts of diesters of phosphoric acid, e.g. sodium 2,2'-methylenebis(4, 6,-di-tert-butylphenyl)phosphate or aluminium-hydroxy-bis[2,2'-methylene-bis(4,6-di-t-butylphenyl)phosphate], and hydroxybis (2,4,8,10-tetra-tert-butyl-6-hydroxy-12Hdibenzo(d,g)(1,3,2)dioxaphosphocin 6-oxidato)aluminium, wherein hydroxybis (2,4,8,10-tetra-tert-butyl-6-hydroxy-12H-dibenzo(d,g)(1,3,2)dioxaphosphocin 6-oxidato)aluminium is preferred; and
(iii) polymeric nucleating agents, such as polymerised vinyl compounds, in particular polymerised vinyl cycloalkanes, like vinyl cyclohexane (VCH), vinylcyclopentane, and vinyl-2-methyl cyclohexane, 3-methyl-1-butene, 3-ethyl-1-hexene, 3-methyl-1-pentene, 4-methyl-1-pentene or mixtures thereof. Poly(vinyl cyclohexane) (PVCH) is particularly preferred.

Preferred nucleating agents comprised by the heterophasic polypropylene composition of the present invention are select from groups (iii), especially preferred is poly(vinyl cyclohexane) (PVCH).

Polymeric nucleating agents from group (iii) can either be incorporated by in-reactor nucleation or by the so called Masterbatch technology (compounding technology) as mentioned below.

In a preferred embodiment of the present invention, the polymeric nucleating agent is introduced into the heterophasic polypropylene composition by means of a suitably modified catalyst, into the reactor (i.e. in-reactor nucleation) i.e. the catalyst to be used in catalysing the polymerisation of any of the fractions a) or b), is subjected to a polymerisation of a suitable monomer for the polymeric nucleating agent to produce said polymeric nucleating agent. The catalyst is then introduced together with the obtained polymeric nucleating agent to the polymerisation step of the polypropylene random copolymer (a) or polypropylene homopolymer or further polypropylene random copolymer (b) In a particularly preferred embodiment of the present invention, the propylene polymer is prepared in the presence of such a modified catalyst to obtain said reactor made heterophasic polypropylene composition. With such modified catalyst, it is also possible to carry out the above-identified preferred polymerisation sequence for the preparation of in-situ blended multimodal, including bimodal, polypropylenes.

Another embodiment, different to the above mentioned in-reactor blend, is a mechanical blend of a polymer with a nucleating agent, wherein the polymer is first produced in the absence of a polymeric nucleating agent and is then blended mechanically with the polymeric nucleating agent or with a small amount of nucleated polymer or with polymers, which already contain the polymeric nucleating agent (so-called master batch technology) in order to introduce the polymeric nucleating agent into the polymer mixture. The preparation of a reactor made polymer composition ensures the preparation of a homogenous mixture of the components, for example a homogenously distributed polymeric nucleating agent in the heterophasic polypropylene composition, even at high concentrations of polymer nucleating agent. The masterbatch technology is preferred.

The skilled person is aware that the heterophasic polypropylene composition of the present invention can also comprise further additives, like stabilisers or other adjuvants. Typical additives are acid scavengers, antioxidants, colorants, light stabilisers, plasticisers, slip agents, anti-scratch agents, dispersing agents, processing aids, lubricants, pigments, and the like.

Furthermore, the term "additives" according to the present invention also includes carrier materials, in particular polymeric carrier materials.

a) Propylene-Random Copolymer

The matrix of the heterophasic polypropylene composition of the present invention is formed by a propylene-random copolymer.

The term "random copolymer" has to be preferably understood according to IUPAC (Pure Appl. Chem., Vol. No. 68, 8, pp. 1591 to 1595, 1996).

The propylene-random copolymer comprises propylene and ethylene as monomer units, preferably consists of propylene and ethylene as monomer units.

The propylene-random copolymer may have a melt flow rate ($MFR_2$) in the range of from 1.0 to 60 g/10 min, preferably in the range of from 5.0 to 45 g/10 min, more preferably in the range of from 15 to 30 g/10 min. The $MFR_2$ is determined according to ISO 1133, at a temperature of 230° C. and under a load of 2.16 kg.

The propylene-random copolymer comprises, preferably consists of propylene and ethylene as monomer units in the range from 2.0 to 5.0 wt.-%, preferably in the range of from 2.5 to 4.6 wt %, relative to the total amount of monomers present in the second propylene polymer fraction.

Ideally the comonomer content is 3.0 to 4.2 wt.-%, like in the range of 3.4-4.0 wt.-%.

The propylene-random copolymer used in the heterophasic polypropylene composition of the present invention is further defined by its polymer fractions present. Accordingly the propylene-random copolymer used for the heterophasic polypropylene composition of the present invention comprises at least, preferably consists of, two fractions, namely the polypropylene fraction (A), which is produced in the first reactor (R-1) and the propylene copolymer, which is produced in the second reactor (R-2), forming together the propylene copolymer fraction (B).

Preferably, the propylene copolymer fraction (B) is ident with the propylene-random copolymer of the heterophasic polypropylene composition of the present invention.

Preferably the polypropylene fraction (A) forms 30-70 wt.-% of the propylene copolymer fraction (B), preferably of 35-65 wt.-%, more preferably of 45-55 wt.-%.

Accordingly, it is preferred, that the propylene random copolymer comprises 30-70 wt.-% of the polypropylene fraction (A), preferably of 35-65 wt.-%, more preferably of 45-55 wt.-%.

Further, the polypropylene fraction (A) is preferably the comonomer lean fraction whereas the propylene copolymer fraction (B) is the comonomer rich fraction.

Thus it is appreciated that the polypropylene (A) generally has a comonomer content in the range of from 0.0 to 3.0 wt.-%, preferably in the range of from 0.3 to 2.9 wt.-%, more preferably in the range of from 0.5 to 2.8 wt.-%, relative to the total amount of monomers present in the first propylene.

In a preferred embodiment, the polypropylene (A) generally has a comonomer content in the range of from 0.0 to 1.8 wt.-%, preferably in the range of from 0.3 to 1.5 wt.-%, more preferably in the range of from 0.5 to 1.2 wt.-%, relative to the total amount of monomers present in the first propylene.

Preferably the polypropylene (A) is a random propylene copolymer and comprises, preferably consists of units derivable from ethylene and propylene only.

The polypropylene fraction (A) may have a melt flow rate (MFR$_2$) in the range of from 1.0 to 40 g/10 min, preferably in the range of from 5.0 to 35 g/10 min, more preferably in the range of from 10 to 30 g/10 min. The MFR$_2$ is determined according to ISO 1133, at a temperature of 230° C. and under a load of 2.16 kg.

The propylene copolymer produced in the second polymerisation step, e.g. in the gas-phase-reactor as shown in the present invention, preferably has a higher comonomer content than the polypropylene fraction (A) and the propylene copolymer fraction (B).

Accordingly the propylene copolymer fraction has a comonomer content of equal or more than 2.5 wt.-% to equal or below 16.0 wt.-%, more preferably of equal or more than 3.0 to 12.0 wt.-%, still more preferably of equal or more than 3.5 to 10.0 wt.-%.

Preferably the propylene copolymer produced in the second polymerisation step is a random propylene copolymer.

The propylene copolymer fraction (B) may comprise, preferably consists of units derivable from ethylene and propylene only.

The polypropylene fraction (A) and the propylene copolymer may be produced in parallel or—preferably—in consecutive polymerisation forming together the propylene copolymer fraction (B).

When a consecutive polymerisation process is applied, it is understood, that the propylene copolymer in the second polymerisation is produced in the presence of the polypropylene fraction (A) forming together the propylene copolymer fraction (B).

Accordingly any properties given for the propylene copolymer fraction (B) are understood as the sum of the all the fractions produced in/during the first and second polymerisation step.

The propylene copolymer fraction (B) generally may have a comonomer content in the range, from 2.0 to 5.0 wt.-%, preferably in the range of from 2.5 to 4.6 wt.-%, relative to the total amount of monomers present in the second propylene polymer fraction.

Ideally the comonomer content is 3.0 to 4.2 wt.-%, like in the range of 3.4 to 4.0 wt.-%.

The propylene copolymer (B) may have a melt flow rate (MFR$_2$) in the range of from 1.0 to 60 g/10 min, preferably in the range of from 5 to 45 g/10 min, more preferably in the range of from 15 to 30 g/10 min. The MFR$_2$ is determined according to ISO1133, at a temperature of 230° C. and under a load of 2.16 kg.

The propylene-random copolymer used in the heterophasic polypropylene composition of the present invention can be produced by any known polymerisation method and polymerisation technologies.

Preferably, the propylene-random copolymer is produced in a loop reactor for producing the first polypropylene fraction (A) of the propylene-random copolymer, followed by one or more gas-phase reactors producing the propylene copolymer fraction (B).

A preferred multistage process is a "loop-gas phase"-process, as developed by Borealis (known as BORSTAR® technology) and is described e.g. in patent literature, such as in EP 887379, WO 92/12182 WO 2004/000899, WO 2004/111095, WO 99/24478, WO 99/24479 or in WO 00/68315.

A further suitable slurry-gas phase process is the Spheripol® process of Basell.

Each or the fractions comprises, preferably consists of propylene and ethylene as (co-) monomer units.

Catalyst:

Generally, a polymerisation catalyst is present in the process according to the invention. The polymerisation catalyst is preferably a Ziegler-Natta catalyst. Generally, the polymerisation Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

Preferably, the internal donor is a non-phthalic compound. Accordingly, the propylene-random copolymer used in the heterophasic polypropylene composition of the invention is free of phthalic compound.

The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives thereof and/or mixtures thereof. Preferred examples are e.g. substituted maleates and citraconates, most preferably citraconates.

b) Linear Low Density Polyethylene (LLDPE)

The heterophasic polypropylene composition of the present invention comprises a linear low density polyethylene (LLDPE) as modifier.

The LLDPE forms (finely) dispersed inclusions not being part of the matrix and said inclusions contain the modifier. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA).

The LLDPE used for the heterophasic polypropylene composition of the present invention has a density of 905 to 923 kg/m$^3$, preferably in the range of 908 to 921 kg/m$^3$, preferably of 912 to 920 kg/m$^3$.

The LLDPE has a melting temperature in the range of 110-125° C., preferably in the range of 115 to 124° C., more preferably in the range of 119-123° C.

The LLDPE used in the heterophasic polypropylene composition of the present invention may further be characterised by a specific melt enthalpy (Hm) of the melting peak occurring between 110-125° C. The melt enthalpy (Hm) may be in the range of 30-180 J/g, preferably in the range of 70-150 J/g, more preferably in the range of 100-130 J/g.

The LLDPE may have an MFR2 (according to ISO 1133 at 190° C. under 2.16 kg load) of 0.1-30.0 g/10 min, preferably in the range of 0.5-20.0 g/10 min, like more preferably in the range of 1.0-8.0 g/10 min.

The LLDPE may have a molecular weight distribution (MWD), being the ratio of the weight average molecular weight (Mw) to the number average molecular weight (Mn), of 1.5 to 10.0.

Preferably, the ratio Mw/Mn is 2.0 to 8.5, in particular in a range of 3.0 to 7.0 In a particular preferred embodiment, the LLDPE may have a molecular weight distribution (MWD), being the ratio of the weight average molecular weight (Mw) to the number average molecular weight (Mn), of 1.5 to 5.0.

Preferably, the ratio Mw/Mn is 2.0 to 5.0, in particular in a range of 2.2 to 4.8, more preferably in a range of 2.4 to 4.6.

The LLDPE is a copolymer of ethylene and one or more comonomers selected from alpha olefins having from 4 to 10 carbon atoms.

Preferably, the LLDPE is a terpolymer of ethylene and two different comonomers selected from alpha olefins having from 4 to 10 carbon atoms.

The two alpha-olefin comonomers having from 4 to 10 carbon atoms of the LLDPE terpolymer are preferably 1-butene and 1-hexene.

Equally preferred are copolymers of ethylene and 1-octene.

The LLDPE may be uni or multimodal, wherein both options are equally preferred.

In chase the LLDPE is a bi- or multimodal polyethylene terpolymer, it may comprise at least
(i) an ethylene polymer component (A) and
(ii) an ethylene polymer component (B), wherein the MFR2 of the ethylene polymer component (A) is higher than the MFR2 of the ethylene polymer component (B)

The multimodal polyethylene terpolymer can have further multimodality with respect to one or more further properties between the ethylene polymer components (A) and (B), such as the comonomer content and comonomer quality.

Accordingly, the LLDPE may be bi or multimodal with respect to, i.e. the difference between, the comonomer type or the comonomer content(s) present in the ethylene polymer components (A) and (B), or both the type and content(s) of comonomers present in the ethylene polymer components (A) and (B); and/or the density of the ethylene polymer components (A) and (B).

Preferably, the bi- or multimodal polyethylene terpolymer is further bi- or multimodal with respect to comonomer type and/or comonomer content (mol %), preferably wherein the alpha-olefin comonomer having from 4 to 10 carbon atoms of ethylene polymer component (A) is different from the alpha-olefin comonomer having from 4 to 10 carbon atoms of ethylene polymer component (B), preferably wherein the alpha-olefin comonomer having from 4 to 10 carbon atoms of ethylene polymer component (A) is 1-butene and the alphaolefin comonomer having from 4 to 10 carbon atoms of ethylene polymer component (B) is 1-hexene. Preferably, the ethylene polymer component (A) has lower amount (mol %) of comonomer than the ethylene polymer component (B), whereby the amount of comonomer, preferably of 1-butene in the ethylene polymer component (A) is from 0.1 to 2.5 mol % more preferably from 0.5 to 2.0 mol %.

The LLDPE used in the heterophasic polypropylene composition of the present invention is preferably produced in the presence of a metallocene catalyst as described in WO 2017/216095A1.

In an equally preferred alternative embodiment, the LLDPE used in the heterophasic polypropylene composition of the present invention may be produced in the presence of a Ziegler-Natta catalyst system.

c) Producing the Heterophasic Polypropylene Composition

The heterophasic polypropylene composition of the present invention can be prepared by any suitable method known in the art, such as by blending the propylene-random copolymer with the LLDPE in an extruder, such that the same extruder is used to make the finished product, or by pre-melt mixing in a separate mixer or extruder. For mixing, a conventional compounding or blending apparatus, e.g. a Banbury mixer, a 2-roll rubber mill, Buss-co-kneader or a twin screw extruder may be used.

MECHANICAL PROPERTIES OF THE HETEROPHASIC POLYPROPYLENE COMPOSITION

The heterophasic polypropylene composition of the present invention has Charpy notched impact strength (NIS+23) determined according to ISO179/1 eA at 23° C. of at least 6.5 to 20.0 kJ/m$^2$, preferably in the range of 7.0 to 18.0, like in the range of 8.0 to 14 kJ/m$^2$.

The heterophasic polypropylene composition has a specific ratio of the Charpy notched impact strength to the amount of fraction soluble in cold xylene (NIS+23)/(XCS) of 0.60 to 1.50, like in the range of 0.70 to 1.35, preferably in the range of 0.80 to 1.25.

In a particular embodiment, the heterophasic polypropylene composition of the present invention may have
i) a Charpy notched impact strength (NIS+23° C.) of 6.5 to 20 kJ/m$^2$ and
ii) a fraction soluble in cold xylene (XCS) of 0.1 to 18.0 wt.-% when determined according to ISO 16152 at 25° C. and optionally
iii) a ratio of Charpy notched impact strength to the fraction soluble in cold xylene (XCS) (NIS+23° C./XCS) of 0.60 to 1.50

The heterophasic polypropylene composition of the present invention is featured also by good puncture resistance (IPT), when measured in instrumented puncture test according to ISO 6603-2 at +23° C. or −20° C. on injection moulded plaques of 60×60×2 mm$^3$.

The IPT +23° C. of the heterophasic polypropylene composition of the present invention may be in the range of 10.0 to 50 J, preferably in the range of 14.0 to 40.0 J, more preferably in the range of 20.0 to 30.0 J.

The IPT −20° C. of the heterophasic polypropylene composition of the present invention may be in the range of 1.0 to 30.0 J, preferably in the range of 5.0 to 25.0 J, more preferably in the range of 8.0 to 22.0 J.

The heterophasic polypropylene composition of the present invention is featured by a Flexural Modulus according to ISO178 of 700-1600 MPa, preferably in the range of 750-1400 MPa, more preferably in the range of 800-1200 MPa.

The heterophasic polypropylene composition has good haze when measured on 1 mm thick plaques according to ASTM 1003-D. Said value is denominated as Haze$_1$.

Haze$_1$ of the heterophasic polypropylene composition may be in the range of 5.0-38.0%, preferably in the range of 15.0-35.0%, more preferably in the range of 20.0-30.0%

ARTICLES

The present invention is further concerned with a moulded article comprising the processed heterophasic polypropylene composition as described herein. The moulded article may preferably an injection moulded article, an injection blow mouldied or an injection stretch blow moulded article.

The main end-uses for such moulded articles are in packaging applications like thin wall packaging for frozen or fresh food, adhesives, cosmetics or pharmaceuticals. Other end-uses are plastic containers and household articles, like detergent cartons, cup and plate boards for oven or microwave use or sterilizable food packaging, furthermore caps, in particular closure caps, screw caps or a closure system for food or fluid packaging or but also medical or diagnostic products.

The present invention is also concerned with the use of the heterophasic polypropylene composition for producing above articles.

The present invention will now be described in further detail by the examples provided below:

EXAMPLES

Measuring Methods

Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene (or compositions comprising more than 50 wt-%. of polypropylene) is determined at a temperature of 230° C. and under a load of 2.16 kg.

The MFR of pure polyethylenes is determined at 190° C. under a load of 2.16.

Differential Scanning Calorimetry (DSC) Differential scanning calorimetry (DSC) analysis, melting temperature (Tm) and melt enthalpy (Hm), crystallization temperature (Tc), and heat of crystallization (Hc, HCR) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of (−30) to +225° C. Crystallization temperature (Tc) and heat of crystallization (Hc) are determined from the cooling step, while melting temperature (Tm) and melt enthalpy (Hm) are determined from the second heating step Comonomer Content Poly(propylene-co-ethylene)—Ethylene Content By IR Spectroscopy Quantitative infrared (IR) spectroscopy was used to quantify the ethylene content of the poly(ethylene-co-propene) copolymers through calibration to a primary method. Calibration was facilitated through the use of a set of in-house non-commercial calibration standards of known ethylene contents determined by quantitative $^{13}C$ solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt % produced at either pilot or full scale under a variety of conditions. The calibration set was selected to reflect the typical variety of copolymers encountered by the final quantitative IR spectroscopy method. Quantitative IR spectra were recorded in the solid-state using a Bruker Vertex 70 FTIR spectrometer. Spectra were recorded on 25×25 mm square films of 300 um thickness prepared by compression moulding at 180-210° C. and 4-6 mPa. For samples with very high ethylene contents (>50 mol %) 100 um thick films were used. Standard transmission FTIR spectroscopy was employed using a spectral range of 5000-500 $cm^{-1}$, an aperture of 6 mm, a spectral resolution of 2 $cm^{-1}$, 16 background scans, 16 spectrum scans, an interferogram zero filling factor of 64 and Blackmann-Harris 3-term apodisation.

Quantitative analysis was undertaken using the total area of the $CH_2$ rocking deformations at 730 and 720 $cm^{-1}$ ($A_Q$) corresponding to $(CH_2)_{>2}$ structural units (integration method G, limits 762 and 694 $cm^{-1}$). The quantitative band was normalised to the area of the CH band at 4323 $cm^{-1}$ (AR) corresponding to CH structural units (integration method G, limits 4650, 4007 $cm^{-1}$). The ethylene content in units of weight percent was then predicted from the normalised absorption ($A_Q/A_R$) using a quadratic calibration curve. The calibration curve having previously been constructed by ordinary least squares (OLS) regression of the normalised absorptions and primary comonomer contents measured on the calibration set.

Poly(propylene-co-ethylene)—Ethylene Content For Calibration Using $^{13}C$ NMR Spectroscopy Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E)

The comonomer fraction was quantified using the method of Wang et. al. (VVang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. The mole percent comonomer incorporation was calculated from the mole fraction: E [mol %]=100*fE. The weight percent comonomer incorporation was calculated from the mole fraction: E [wt %]=100*(fE*28.06)/((fE*28.06)+((1−fE)*42.08))

Xylene Soluble Content (XCS) The content of the polymer soluble in xylene is determined according to ISO 16152; $5^{th}$ edition; 2005-07-01 at 25° C.

Flexural Modulus

Flexural Modulus is determined according to ISO 178 at 23° C. on injection moulded test specimens as described in EN ISO 1873-2 (80×10×4 mm).

Charpy Notched Impact

Charpy notched impact strength was determined according to ISO 179/1eA at injection moulded test specimens as described in EN ISO 1873-2 (80×10×4 mm).

Puncture Energy (IPT)

Puncture energy (IPT) is determined in the instrumented falling weight test according to ISO 6603-2 using injection moulded plaques of 60×60×2 mm and a test speed of 4.4 m/s, clamped, lubricated striker with 20 mm diameter at test temperatures of +23° C. and (20° C.) respectively. The reported puncture energy results from an integral of the failure energy curve measured at (60×60×2 mm).

Haze

Haze is determined according to ASTM D1003 on injection moulded plaques having 1 mm thickness and 60×60 mm² area produced as described in EN ISO 1873-2.

MATERIAL DESCRIPTION

The catalyst for producing the propylene-random copolymer was prepared as disclosed in WO 2019/002345 A1, page 22.

Polymerisation Details:

TABLE 1

Polymerisation details for propylene-random copolymers PP1 and PP2

|  |  | PP1 | PP2 |
|---|---|---|---|
| Prepolymerisation |  |  |  |
| Temperature | [° C.] | 30 | 30 |
| Al/D-Donor [Co/ED] | [mol/mol] | 8.3 | 8.3 |
| Al/Ti [Co/TM] | [mol/mol] | 192 | 192 |
| Residence Time | [h] | 0.3 | 0.3 |
| Loop Reactor (1st PP fraction) |  |  |  |
| Temperature | [° C.] | 70 | 70 |
| Pressure | [kPa] | 5400 | 5400 |
| Residence time | [h] | 0.4 | 0.4 |

TABLE 1-continued

Polymerisation details for propylene-random copolymers PP1 and PP2

|  |  | PP1 | PP2 |
|---|---|---|---|
| Split | [%] | 45 | 35 |
| $H_2/C_3$ ratio | [mol/kmol] | 1 | 1.7 |
| $C_2/C_3$ ratio | [mol/kmol] | 15.6 | 1.5 |
| $MFR_2$ | [g/10 min] | 11 | 22 |
| $C_2$ content | [wt %] | 2 | 0.5 |
| Gas phase reactor (GPR) |  |  |  |
| Temperature | [° C.] | 80 | 80 |
| Pressure | [kPa] | 2500 | 2500 |
| Residence time | [h] | 1.6 | 1.4 |
| Split | [%] | 55 | 65 |
| $H_2/C_3$ ratio | [mol/kmol] | 7 | 43.7 |
| $C_2/C_3$ ratio | [mol/kmol] | 15 | 29.2 |
| Final polymer |  |  |  |
| $MFR_2$ | [g/10 min] | 11 | 24 |
| $C_2$ content | [wt %] | 3.0 | 3.5 |

PP1 is a bimodal ZN propylene-ethylene random copolymer having an ethylene content of 3 wt.-% and an MFR230/2.16 of 13 g/10 min. It is nucleated with 1700 ppm of DMDBS.

PP2 is a bimodal ZN propylene-ethylene random copolymer. It has ethylene content of 3.5 wt.-% and an MFR230/2.16 of 24 g/10 min It is nucleated with 1700 ppm of DMDBS and 0.6 ppm of PVCH.

"LLDPE" is a linear low density polyethylene, produced with a single-site catalyst. It has a MFR (190° C., 2.16 kg) of 1.5 g/10 min, a melting temperature of 122° C. and a density of 918 kg/m³.

Queo 8201, is an ethylene based 1-octene plastomer, having a density (ISO 1183) of 883 kg/m3, and a melt flow rate at 190° C. with a load of 2.16 kg (ISO 1133) of 1.1 g/10 min. It is commercially available from Borealis.

CA 9150 is a LDPE, it has MFR (190° C., 2.16 kg) 15 g/10 min, a melting temperature of 73° C., density of 915 kg/m³ and is commercially available from Borealis.

Stamylex 1066 is a unimodal ZN LLDPE having 1-octene as comonomer. It has a MFR (190° C., 2.16 kg) of 6.6 g/10 min, a melting temperature of 124° C., a molecular weight distribution of 3.4 and a density of 919 kg/m³, supplied by Borealis.

Mechanical Performance

TABLE 2

Compositions and mechanical properties

|  |  | IE1 | IE2 | IE3 | IE4 | CE1 | CE2 | CE3 | CE4 |
|---|---|---|---|---|---|---|---|---|---|
| PP1 | Wt.-% | 87.5 |  |  |  | 100 |  |  |  |
| PP2 | Wt.-% |  | 87.5 | 75 | 87.5 |  | 87.5 | 87.5 | 100 |
| LLDPE | Wt.-% | 12.5 | 12.5 | 25 |  |  |  |  |  |
| Queo 8201 | Wt.-% |  |  |  |  |  | 12.5 |  |  |
| Stamylex 1066 | Wt.-% |  |  |  | 12.5 |  |  |  |  |
| CA9150 | Wt.-% |  |  |  |  |  |  | 12.5 |  |
| MFR | g/10 min | 12.5 | 18 | 14 | 20 | 11 | 17 | 23 | 20 |
| XCS | Wt.-% | 6.7 | 9.0 | 7.8 | 10.4 | 7 | 21.2 | 8.6 | 9.5 |
| Tc2 | ° C. | 120 | 126 | 126 | 127 | 119 | 127 | 126 | 127 |
| Tc1 | ° C. | 109 | 110 | 111 | 110 |  |  | 100 | n.d. |
| Tm2 | ° C. | 150 | 159 | 158 | 159 | 150 | 159 | 159 | 159 |
| Tm1 | ° C. | 122 | 122 | 122 | 123 | — | 74 | 111 | — |
| Hm2 | J/g | 25 | 54 | 44 | 57 | 26.7 | 75 | 63 | 89 |
| Hm1 | J/g | 34 | 32 | 50 | 32 |  | 1.6 | 28 |  |
| Charpy NIS + 23 | kJ/m² | 7.0 | 6.7 | 9.4 | 7.6 | 6.0 | 7.0 | 4.2 | 5.8 |
| Flexural Modulus | MPa | 981 | 919 | 816 | 887 | 1116 | 850 | 891 | 1100 |
| Haze 1 mm | % | 25.8 | 28.8 | 32.8 | 18.1 | 14.0 | 39.6 | 58.4 | 22.4 |
| IPT/23° C. | J | 24.2 | 21.5 | 22.5 | 23.4 | n.d | 22.6 | 20.2 | 21.8 |
| IPT/−20° C. | J | 1.0 | 0.9 | 15.5 | 0.9 | n.d | 6.9 | 0.7 | 0.7 |
| Charpy NIS/XCS | — | 1.04 | 0.74 | 1.20 | 0.73 | 0.86 | 0.33 | 0.48 | 0.61 |

The invention claimed is:

1. A heterophasic polypropylene composition (PP-C) comprising
    65.0-95.0 wt % of a propylene random copolymer having a comonomer content of 2.0-5.0 wt % and
    5.0-35.0 wt % of a linear low density polyethylene (LLDPE) having a density in a range of 905-923 kg/m$^3$, when measured according to ISO1183,
    wherein the heterophasic polypropylene composition has at least one first melting peak in a range of 110-125° C. and said first melting peak has a melt enthalpy of 30-100 J/g when determined according to ISO11357.

2. The heterophasic polypropylene composition (PP-C) according to claim 1, comprising 70.0-92.0 wt % of the propylene random copolymer and 8.0-30.0 wt % of the linear low density polyethylene (LLDPE).

3. The heterophasic polypropylene composition (PP-C) according to claim 1, wherein the heterophasic polypropylene composition (PP-C) has at least a first and a second melting peak.

4. The heterophasic polypropylene composition (PP-C) according to claim 1, wherein the linear low density polyethylene (LLDPE) has a density of 910 to 921 kg/m$^3$ and/or an MFR (190/2) of 0.1-30 g/10 min when measured according to ISO1133.

5. The heterophasic polypropylene composition (PP-C) according to claim 1, wherein the linear low density polyethylene (LLDPE) is a terpolymer of ethylene and two different comonomers selected from alpha olefins having from 4 to 10 carbon atoms.

6. The heterophasic polypropylene composition (PP-C) according to claim 1, wherein the heterophasic polypropylene composition (PP-C) has a MFR230/2.16 according to ISO1133 of 1.0-60 g/10 min.

7. The heterophasic polypropylene composition (PP-C) according to claim 1, wherein the LLDPE is produced in the presence of a metallocene catalyst.

8. The heterophasic polypropylene composition (PP-C) according to claim 1, wherein 30-70 wt % of the propylene random copolymer comprises a polypropylene fraction (A) having comonomer content in a range of from 0.0 to 1.8 wt %.

9. The heterophasic polypropylene composition (PP-C) according to claim 1, wherein the heterophasic polypropylene composition (PP-C) has:
    i) a Charpy notched impact strength (NIS+23° C.) of 6.5-20 KJ/m$^2$;
    ii) a fraction soluble in cold xylene (XCS) of 0.1-18.0 wt %, when determined according to ISO 16152 at 25° C.;
    iii) a ratio of Charpy notched impact strength to fraction soluble in cold xylene (XCS) (NIS+23° C./XCS) of 0.60 to 1.50; or
    a combination thereof.

10. The heterophasic polypropylene composition (PP-C) according to claim 1, further comprising at least one alpha-nucleating agent, wherein the at least one alpha-nucleating agent is present in a range of 100-10.000 ppm relative to a total amount of the heterophasic polypropylene composition.

11. The heterophasic polypropylene composition (PP-C) according to claim 10, wherein the heterophasic polypropylene composition comprises two different alpha nucleating agents.

12. The heterophasic polypropylene composition (PP-C) according to claim 1, wherein the heterophasic polypropylene composition has a Haze of 5.0 to 38.0%, when determined according to ASTM D1003 on 1 mm plaques.

13. The heterophasic polypropylene composition (PP-C) according to claim 1, wherein the heterophasic polypropylene composition has a flexural modulus according to ISO178 of 700-1600 MPa.

14. An article comprising the heterophasic polypropylene composition (PP-C) according to claim 1, wherein the article is an injection molded article, a container, a closure cap, a screw cap or a closure system for food or fluid packaging.

15. A method of use of the heterophasic polypropylene composition (PP-C) according to claim 1, the method comprising making an injection molded article from the heterophasic polypropylene composition.

16. The method of claim 15, wherein the injection molded article is a closure cap, a screw cap or a closure system for food or fluid packaging.

17. The heterophasic polypropylene composition (PP-C) according to claim 3, wherein the second melting peak is in a range of 140-165° C., when determined according to ISO11357.

18. The heterophasic polypropylene composition (PP-C) according to claim 5, wherein the two different comonomers are 1-butene and 1-hexene.

19. The heterophasic polypropylene composition (PP-C) according to claim 5, wherein the linear low density polyethylene (LLDPE) has a molecular weight distribution (MWD) of 1.5-10.0.

20. The heterophasic polypropylene composition (PP-C) according to claim 10, wherein the at least one alpha-nucleating agent is a soluble nucleating agent.

* * * * *